(12) United States Patent
Li

(10) Patent No.: US 11,368,098 B2
(45) Date of Patent: Jun. 21, 2022

(54) POWER SYSTEM WITH COMMUNICATION FUNCTION APPLIED TO SOLID STATE TRANSFORMER STRUCTURE AND COMMUNICATION MODULE APPLIED TO SOLID STATE TRANSFORMER STRUCTURE

(71) Applicant: DELTA ELECTRONICS, INC., Taoyuan (TW)

(72) Inventor: Sheng-Hua Li, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 7 days.

(21) Appl. No.: 16/929,867

(22) Filed: Jul. 15, 2020

(65) Prior Publication Data

US 2021/0091676 A1    Mar. 25, 2021

(30) Foreign Application Priority Data

Sep. 20, 2019    (CN) .......................... 201910894744.5

(51) Int. Cl.
*H02M 5/42* (2006.01)
*H02M 7/04* (2006.01)
*H02M 1/00* (2006.01)

(52) U.S. Cl.
CPC .............. *H02M 5/42* (2013.01); *H02M 7/04* (2013.01); *H02M 1/007* (2021.05); *H02M 1/0074* (2021.05)

(58) Field of Classification Search
CPC .......... H02M 7/04; H02M 5/42; H02M 1/007; H02M 1/0074
See application file for complete search history.

(56) References Cited

U.S. PATENT DOCUMENTS

| 10,027,122 | B2 | 7/2018 | Badapanda |
| 10,312,820 | B2 | 6/2019 | Fogel |
| 2012/0113698 | A1* | 5/2012 | Inoue ...................... H02M 7/12 363/123 |

FOREIGN PATENT DOCUMENTS

| CN | 106602565 A | 4/2017 |
| CN | 104767442 B | 5/2018 |
| TW | 201803241 A | 1/2018 |
| TW | M579410 U | 6/2019 |

* cited by examiner

*Primary Examiner* — Jue Zhang
(74) *Attorney, Agent, or Firm* — Muncy, Geissler, Olds & Lowe, P.C.

(57) ABSTRACT

A power system with communication function applied to a solid state transformer structure includes a plurality of conversion units, a bus path, a plurality of coupling units, and a control module. The conversion units are coupled to the bus path and the coupling units, and the coupling units are coupled to the control module. Each coupling unit is correspondingly coupled to a control unit of each conversion unit. A first-connected coupling unit of the coupling units is coupled to the control module.

12 Claims, 4 Drawing Sheets

POWER SYSTEM WITH COMMUNICATION FUNCTION APPLIED TO SOLID STATE TRANSFORMER STRUCTURE AND COMMUNICATION MODULE APPLIED TO SOLID STATE TRANSFORMER STRUCTURE

BACKGROUND

Technical Field

The present disclosure relates to a power system with communication function applied to a solid state transformer structure, and more particularly to a power system that reduces the difficulty of wiring of communication wires.

Description of Related Art

The statements in this section merely provide background information related to the present disclosure and do not necessarily constitute prior art.

The power conversion in the traditional power grid is to use bulky, oil-immersed traditional transformers. In recent years, many corporations have been dedicated to the research and development of solid state transformer (SST), which combine high-frequency power converter technology by electromagnetic induction principle with power electronic conversion technology so as to enable power conversion modules operating at medium or high frequencies, thereby significantly reducing the volume. The SST replaces the traditional transformer in the power grid, and its input terminal must withstand high voltage. For example but not limited to, the three-phase AC input is Y-connected three-phase four-wire power grid, and the line voltage of the three-phase AC is 13.2 kV and the voltage per phase is 7.62 kV. Therefore, the input end of each phase SST needs to withstand an AC voltage of 7.62 kV, and then receives the AC voltage in series through the input ends by multiple power modules. Each power module has its own control unit, and then a system control module communicates with the control units in each power module respectively. The control unit in each power module must electrically isolated with the system control module.

The conventional SST application mainly uses an optical fiber cable coupling system control module and the control unit in each of power modules to perform signal transmission with electrical isolation. However, optical fiber cables have the disadvantages of poor physical strength, easy breakage, and high cost of construction. Due to the easily broken optical fiber cable, it becomes difficult to wiring a large number of optical fiber cables in the limited space of the SST cabinet.

Therefore, how to design a power system with communication function applied to SST structure using a photo coupler with unique wiring manner to electrically isolate the control modules in the SST is the important research subject for the inventors.

SUMMARY

In order to solve above-mentioned problems, a power system with communication function applied to a solid state transformer structure is provided. The power system includes a plurality of conversion units, a bus path, a plurality of coupling units, and a control module. Each conversion unit has an input end and an output end, and includes a control unit. The input ends of the conversion units are coupled in series and coupled to an AC power source. The bus path is coupled to the output ends of the conversion units. Each coupling unit has a signal input end and a signal output end. The signal output ends of the coupling units are coupled to the control units respectively. The control module is coupled to the signal input end of a first-connected coupling unit of the coupling units. The signal output end of each coupling unit is connected to the signal input end of a next-connected coupling unit of the coupling units.

In order to solve above-mentioned problems, a communication module applied to a solid state transformer is provided. The communication module is coupled to a plurality of conversion units and a control module, and each conversion unit includes a control unit. The communication module includes a plurality of coupling units. Each coupling unit has a signal input end and a signal output end. The signal output ends of the coupling units are coupled to the control units respectively. The signal input end of a first-connected coupling unit of the coupling units is coupled to the control module, and the signal output end of each coupling unit is connected to the signal input end of a next-connected coupling unit.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawings as follows.

DETAILED DESCRIPTION

Figure 1:
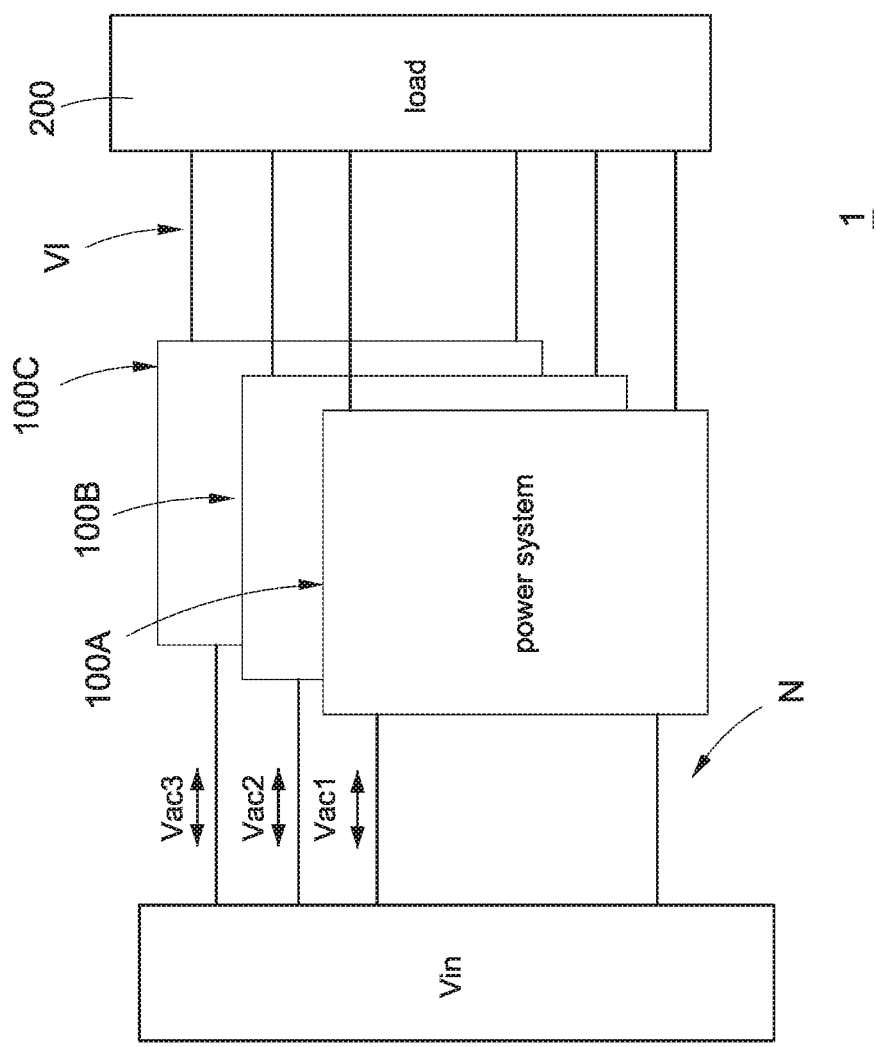
FIG. 1 is a block circuit diagram of a three-phase power system according to the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a block circuit diagram of a three-phase power system according to the present disclosure. The three-phase power system 1 includes three power systems 100A, 100B, 100C with communication function applied to a solid state transformer (SST) structure. Each of the power systems 100A, 100B, 100C is coupled to one AC power source Vac1, Vac2, Vac3 of a three-phase AC power source Vin, and respectively converts the AC power sources Vac1, Vac2, Vac3 into the load power sources Vl to supply power to a plurality of loads 200. In particular, the three-phase AC power source Vin is a medium or high voltage power supply system, for example, the line voltage of the three-phase AC power source Vin is 13.2 kV and the voltage per phase is 7.62 kV. In the present disclosure, the AC power source Vin is not limited to a single phase or a three phase, and is not limited to a Y connection or a delta connection. Each power system can be connected to one or more than one load 200, or all power systems is commonly coupled to one load 200 according to supply power and load demand of the power system. FIG. 1 is only an illustrative example of a Y-connected three-phase AC power source Vin.

Figure 2:
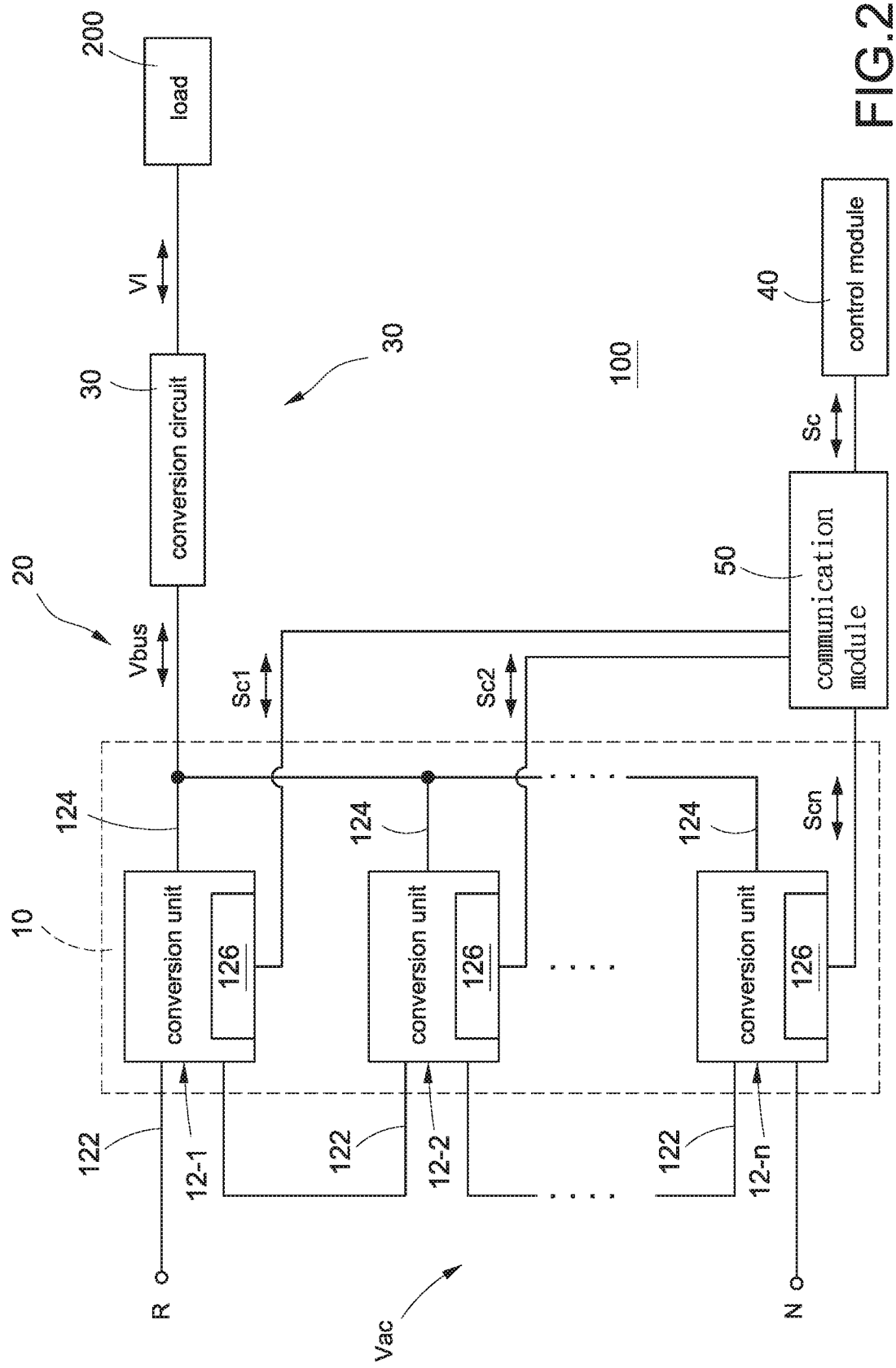
FIG. 2 is a block circuit diagram of a power system with communication function applied to a solid state transformer structure according to the present disclosure.

Please refer to FIG. 2, which shows a block circuit diagram of a power system with communication function applied to a solid state transformer structure according to the present disclosure, and also refer to FIG. 1. The power system 100 includes a conversion module 10, a bus path 20, a conversion circuit 30, and a control module 40. The bus path 20 is coupled to the conversion module 10 and the conversion circuit 30, and the control module 40 is coupled to the conversion module 10. The conversion module 10 receives an AC power source Vac, and the control module 40 controls the conversion module 10 to convert the AC power source Vac into a bus power source Vbus or controls the power distribution of the conversion module 10. The conversion circuit 30 receives the bus power source Vbus through the bus path 20 and converts the bus power source Vbus into the load power sources Vl to supply power to the load 200. In one embodiment, the power of the power system 100A, 100B, 100C can also be fed back from the load 200 to the AC power source Vac, that is, the power path of the power system 100A, 100B, 100C is exactly opposite to the described above, and the detail description is omitted here for conciseness.

Specifically, the conversion module 10 includes a plurality of conversion units 12-1 to 12-$n$, and each of the conversion units 12-1 to 12-$n$ has an input end 122, an output end 124, and a control unit 126. The input ends 122 of the conversion units 12-1 to 12-$n$ are coupled in series, and the first-connected conversion unit 12-1 is coupled to a live wire, such as the R phase of the AC power source Vac, and the last-connected conversion unit 12-$n$ is coupled to a neutral wire N. Due to the connection structure, the input ends 122 of the conversion units 12-1 to 12-$n$ ideally evenly distribute the voltage of the AC power source Vac. The output ends 124 of the conversion units 12-1 to 12-$n$ are coupled to the bus path 20, and the bus path 20 shown in FIG. 2 in the power system 100A, 100B, 100C can be coupled to the same path or separate paths.

The conversion module 10 can be a solid state transformer (SST). The SST is a new type of intelligent transformer suitable for smart grid applications, and it is mainly used to replace the traditional bulky, oil-immersed transformer used in traditional high-voltage power. The traditional transformers are usually designed by wires with a sufficiently large wire diameter so as to withstand low-frequency high-voltage electricity. Therefore, traditional transformers are bulky and cannot be used in space-limited environment. Since the conversion module 10 of the present disclosure has a plurality of conversion units 12-1 to 12-$n$ connected in series at the input ends and the conversion units 12-1 to 12-$n$ operate in high-frequency switching, the volume of the plurality of conversion units 12-1 to 12-$n$ is small. Therefore, the volume of the SST is smaller than that of the conventional high-voltage power transformer. It can not only implement voltage conversion (conversion between high voltage and low voltage), electrical isolation, fault isolation, and other functions, but also implement the frequency conversion (conversion between DC and AC) that cannot be implemented by traditional transformers. Moreover, the SST has both AC and DC links, which can realize the conversion between four states of DC low voltage, DC high voltage, AC low voltage and AC high voltage. Therefore, in the case where the AC power source Vac of the present disclosure is a high voltage power (for example but not limited to, 4.8 kV to 35 kV), it is particularly suitable for applying the SST for bidirectional conversion between a high voltage and a low voltage. Furthermore, the usage of SST overcomes the shortcoming that the traditional transformer is only suitable for single frequency and unidirectional voltage conversion, and cannot convert the voltage bidirectionally.

The control module 40 is coupled to the control units 126 of the conversion units 12-1 to 12-$n$, and communicated with the control units 126 by the control signal Sc. The control units 126 control the conversion units 12-1 to 12-$n$ to convert the AC power source Vac into the bus power source Vbus and stabilize the voltage value of the bus power source Vbus provided from the conversion units 12-1 to 12-$n$. Alternatively, the control units 126 control the conversion units 12-1 to 12-$n$ to convert the bus power source Vbus into the AC power source Vac and feed the AC power source Vac back to the power grid. The control module 40 realizes the conditions of the control units 126 through the control signal Sc and controls the control units 126 to adjust output currents of the conversion units 12-1 to 12-$n$ through the control signal Sc so that the output current of each of the conversion units 12-1 to 12-$n$ is equalized or configured according to demands. The conversion circuit 30 may internally include a single or a plurality of converters (not shown), and the converter may be a DC-to-DC converter or a DC-to-AC converter depending on demands of the load 200. The conversion circuit 30 is coupled to the bus path 20 and the load 200, and the number of the loads 200 that can be coupled is determined by the number of the converters. The conversion circuit 30 can convert the bus power source Vbus into the load power source Vl according to the power configuration of the power systems 100A, 100B, 100C and provide the load power source Vl to the load 200. Alternatively, the conversion circuit 30 can convert the load power source Vl into the bus power source Vbus and provide the bus power source Vbus to the conversion module 10. In one embodiment, the conversion circuit 30 may be absent according to actual applications. That is, when the bus power source Vbus provided by the bus path 20 can be used as operation power for the load 200, the conversion circuit 30 can be absent so that the load 200 is directly coupled to the bus path 20.

In the prior art, the communication between each control unit 126 of the conversion units 12-1 to 12-$n$ and the control module 40 is one-to-one, that is, each control unit 126 has a signal wire connected to the control module 40. Since the voltage received by the power system 100A, 100B, 100C is on the order of several kV to several tens of kV, and the control module 40 is a control device that the personnel may contact with it, therefore, the control module 40 needs to be operated in a working environment with safety voltage (safety extra-low voltage, SELV). Specifically, the safe voltage working environment is an extremely low-voltage working environment in which the working environment is electrically separated from the ground and other systems. The electrical isolation can avoid the risk of electric shock caused by a single fault. The safety voltage is usually set in a working environment such as but not limited to, 50 volts or less. In order to achieve electrical isolation, the signal wire usually uses optical fiber cable for signal transmission. However, since the signal wire of the control module 40 and the control units 126 are connected one-to-one, it is necessary to configure 10 optical fiber cables if there are 10 conversion units. In order to simplify the wiring configuration and improve the space utilization, in the present disclosure, the communication module 50 is used to electrically isolate the medium or high voltage working environment from the safe voltage working environment. The communication module 50 is coupled to the control module 40 and each control unit 126 of the conversion units 12-1 to 12-n.

When the control module 40 wants to control the conversion units 12-1 to 12-n, the control module 40 provides the control signal Sc to the communication module 50, and the control units 126 of the conversion units 12-1 to 12-n acquire the control signal Sc1-Scn to which the self belongs to each other by the communication module 50. When the control units 126 wants to return information to the control module 40, the control units 126 provide the control signals Sc1-Scn to the communication module 50. The communication module 50 integrates the control signals Sc1-Scn into the control signal Sc and provides the control signal Sc to the control module 40. In one embodiment, each power system 100A, 100B, 100C includes one control module 40, but not limited to this. In other words, the three power systems 100A, 100B, 100C can be also integrated into a single control module 40 so that the single control module 40 can collectively control the three power systems 100A, 100B, 100C.

Figure 3:
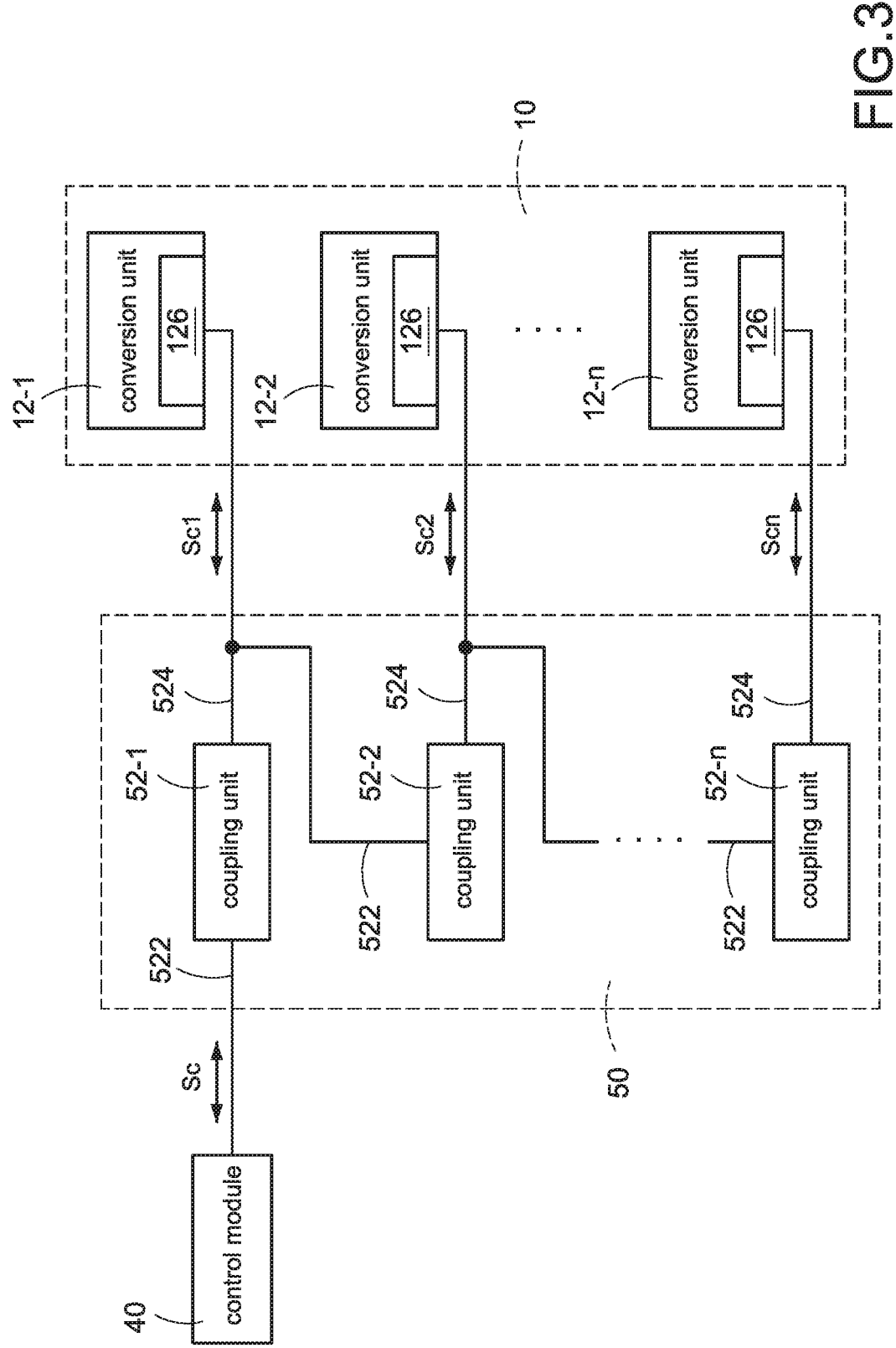
FIG. 3 is a block circuit diagram of a communication module coupling to a conversion module according to a first embodiment of the present disclosure.

Please refer to FIG. 3, which shows a block circuit diagram of a communication module coupling to a conversion module according to a first embodiment of the present disclosure, and also refer to FIG. 1 to FIG. 2. The communication module 50 includes a plurality of coupling units 52-1 to 52-n, and each of the coupling units 52-1 to 52-n has a signal input end 522 and a signal output end 524. The signal output end 524 of one coupling unit 52-1 to 52-n is coupled to the signal input end 522 of the next-connected coupling unit 52-1 to 52-n, that is, the coupling units 52-1 to 52-n are coupled in series, and the signal output ends 524 are correspondingly coupled to the control units 126 of the conversion units 12-1 to 12-n, respectively. The signal input end 522 of the first-connected coupling unit 52-1 is coupled to the control module 40.

Since the control module 40 needs to provide a plurality of control signals Sc1-Scn to the plurality of control units 126 by transmitting the control signal Sc once, the control module 40 needs to transmit the control signal Sc including the plurality of packets to the first-connected coupling unit 52-1 in a unit time. The control unit 126 in the first-connected conversion unit 12-1 acquires the self-belongs control signal Sc1 from the first-connected coupling unit 52-1, and the first-connected coupling unit 52-1 supplies the control signal Sc including the remaining packets to the coupling unit 52-2, follow-up and so on. Since the number of packets in the control signal Sc is equal to the number of the conversion units 12-1 to 12-n, the control unit 126 of each of the conversion units 12-1 to 12-n has a corresponding packet. When the control unit 126 returns the control signals Sc1-Scn, the transmission mode is the same but the paths happen to be opposite, and the detail description is omitted here for conciseness.

In one embodiment, each of the coupling units 52-1 to 52-n is a photo coupler. The photo coupler is characterized in that the signals at both ends of the photo coupler are electrically isolated by the characteristics of optical coupling transmission. Since the power system 100A, 100B, 100C is usually installed in a cabinet with limited space, when an optical fiber cable with the same electrical isolation function is used, the wiring becomes complicated and the arrangement is not easy, and the optical fiber cables are easily broken due to excessive bending. Since the wiring configuration of the communication module 50 of the present disclosure is coupled in series using the coupling units 52-1 to 52-n, the number of wiring between the control module 40 and the control units 126 is reduced. This helps reduce the complexity of configuring the communication module 50 in the cabinet. That is, even if the communication wire coupled to the first-connected coupling unit 52-1 and the control module 40 of the present disclosure still uses the optical fiber cable, the communication wires between the signal output end 524 of one coupling unit 52-1 to 52-n and the signal input end 522 of the next-connected coupling unit 52-1 to 52-n or the communication wires between the communication module 50 to the conversion module 10 can use ordinary wires instead of optical fiber cables. Since the photo coupler has a lower configuration cost than the optical fiber cables, the configuration cost can be reduced and the complexity and space occupied by the communication wires in the cabinet can be also reduced.

Figure 4:
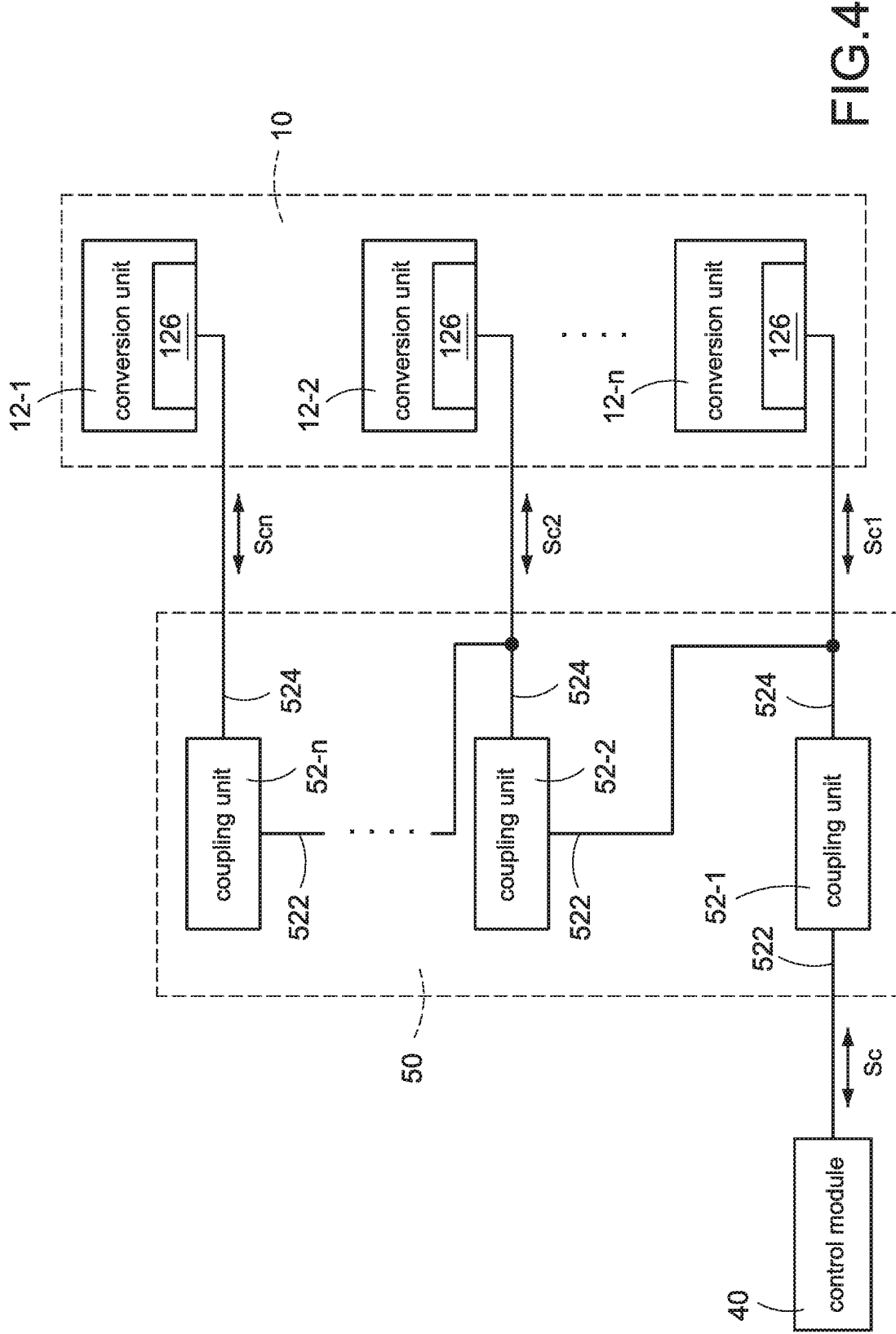
FIG. 4 is a block circuit diagram of the communication module coupling to the conversion module according to a second embodiment of the present disclosure.

Please refer to FIG. 4, which shows a block circuit diagram of the communication module coupling to the conversion module according to a second embodiment of the present disclosure, and also refer to FIG. 1 to FIG. 2. The difference between the second embodiment and the first embodiment shown in FIG. 3 is that the control unit 126 of the last-connected conversion unit 12-n is coupled to the signal output end 524 of the first-connected coupling unit 52-1 as shown in FIG. 4. Specifically, when one end of the input end 122 of the last-connected conversion unit 12-n is coupled to the neutral wire N, the voltage difference between the live wire R and the neutral wire N is as high as 7.62 kV. Since the wire configuration of the communication module 50 of the present disclosure is a characteristic in which the coupling units 52-1 to 52-n are coupled in series, the total withstand voltage value can be equally distributed as in the conversion units 12-1 to 12-n. In other words, the withstand voltage value of each coupling unit 52-1 to 52-n is the total withstand voltage value divided by the number of the coupling units. The total withstand voltage value corresponds to the voltage value of the AC power source Vac, meaning that if the voltage difference between the live wire R and the neutral wire N is as high as 7.62 kV, the design of the total withstand voltage value must be greater than or equal to 7.62 kV. It is assumed that a total of 10 conversion units 12-1 to 12-n correspond to 10 coupling units 52-1 to 52-n, the withstand voltage value of each coupling unit 52-1 to 52-n must be designed to be greater than or equal to 762 volts. The higher the withstand voltage of the coupling units 52-1 to 52-n, the higher the cost. Therefore, the withstand voltage value of each coupling units 52-1 to 52-n is not necessarily equal to or greater than the voltage value of the AC power source Vac. Accordingly, the cost of constructing the communication module 50 can be significantly reduced.

In conclusion, the present disclosure has following features and advantages:

1. By using the special connection manner in which the coupling units of the communication module are coupled in series, the communication between the control module and the power system can significantly reduce the use of the optical fiber cable so as to reduce the complexity and configuration cost of the communication module disposed in the cabinet.

2. The control unit in the safe voltage working environment is electrically isolated from the power system in the high voltage working environment by using the coupling units of the communication module to avoid the risk of the personnel having contact with the high voltage power.

3. Since the coupling units of the communication module can select the withstand voltage value in an equally distributed manner, when the average distribution manner is used to select the withstand voltage value of the coupling units, the effect of the communication module construction cost can be significantly reduced.

4. Since the conversion module uses the SST, the conversion unit is particularly suitable for bidirectional conversion between high voltage and low voltage, thereby overcoming the conventional transformer is only suitable for single frequency, unidirectional voltage transmission, and cannot switch the voltage bidirectionally using the switching converters.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power system with communication function applied to a solid state transformer structure, comprising:
    a plurality of conversion units, each conversion unit having an input end and an output end, and comprising a control unit, wherein the input ends of the conversion units are coupled in series and the input end of a first-connected conversion unit of the conversion units is coupled to one end of an AC power source, and the input end of a last-connected conversion unit of the conversion units is coupled to the other end of the AC power source,
    a bus path coupled to the output ends of the conversion units,
    a plurality of coupling units, each coupling unit having a signal input end and a signal output end, wherein the signal output ends of the coupling units are coupled to the control units respectively, and
    a control module coupled to the signal input end of a first-connected coupling unit of the coupling units, and
    wherein the signal output end of each coupling unit is connected to the signal input end of a next-connected coupling unit of the coupling units.

2. The power system in claim 1, wherein the other end of the AC power source is a neutral wire, and the input end of the last-connected conversion units is coupled to the neutral wire.

3. The power system in claim 1, wherein the control unit of the first-connected conversion unit of the conversion units is coupled to the signal output end of the first-connected coupling unit, or the control unit of the last-connected conversion unit of the conversion units is coupled to the signal output end of the first-connected coupling unit.

4. The power system in claim 1, wherein the coupling units are configured to equally distribute a total withstand voltage value corresponding to a voltage value of the AC power source.

5. The power system in claim 1, wherein each of the coupling units is a photo coupler, and the photo coupler electrically isolates the control module in safe voltage working environment from the control unit in high voltage working environment.

6. The power system in claim 1, wherein the control module is configured to transmit a plurality of packets to the first-connected coupling unit in a unit time, and the number of the packets is equal to the number of the conversion units so that the control unit of each conversion unit correspondingly receives one of the packets.

7. The power system in claim 1, wherein the control unit in each conversion unit is configured to control each conversion unit to convert the AC power source into a bus power source, and provide the bus power source to the bus path.

8. A communication module applied to a solid state transformer coupled to a plurality of conversion units and a control module, and each conversion unit comprising a control unit, and each conversion unit having an input end, and the input end of each conversion unit coupled in series, and the input end of a first-connected conversion unit of the conversion units coupled to one end of an AC power source, and the input end of a last-connected conversion unit of the conversion units coupled to the other end of the AC power source, the communication module comprising:
    a plurality of coupling units, each coupling unit having a signal input end and a signal output end, wherein the signal output ends of the coupling units are coupled to the control units respectively,
    wherein the signal input end of a first-connected coupling unit of the coupling units is coupled to the control module, and the signal output end of each coupling unit is connected to the signal input end of a next-connected coupling unit.

9. The communication module in claim 8, wherein the other end of the AC power source is a neutral wire, and the input end of the last-connected conversion unit of the conversion units is coupled to the neutral wire.

10. The communication module in claim 8, wherein the control unit of the first-connected conversion unit of the conversion units is coupled to the signal output end of the first-connected coupling unit, or the control unit of the last-connected conversion unit of the conversion units is coupled to the signal output end of the first-connected coupling unit.

11. The communication module in claim 8, wherein the coupling units are configured to equally distribute a total withstand voltage value corresponding to a voltage value of the AC power source.

12. The communication module in claim 8, wherein each of the coupling units is a photo coupler, and the photo coupler electrically isolates the control module in safe voltage working environment from the control unit in high voltage working environment.

* * * * *